United States Patent
Bellows

(10) Patent No.: US 7,431,757 B2
(45) Date of Patent: Oct. 7, 2008

(54) WATER AND SULFUR REMOVAL FROM COMBUSTION TURBINE EXHAUST

(75) Inventor: James C. Bellows, Maitland, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 413 days.

(21) Appl. No.: 11/252,954

(22) Filed: Oct. 18, 2005

(65) Prior Publication Data

US 2006/0037324 A1 Feb. 23, 2006

Related U.S. Application Data

(60) Division of application No. 10/959,533, filed on Oct. 6, 2004, now Pat. No. 7,017,330, and a continuation-in-part of application No. 10/247,163, filed on Sep. 19, 2002, now Pat. No. 6,804,964.

(51) Int. Cl.
*B01D 53/14* (2006.01)
*B01D 53/26* (2006.01)

(52) U.S. Cl. .............................. 96/244; 96/295; 60/310; 423/243.01

(58) Field of Classification Search .................... 96/234, 96/244, 267, 290, 295; 95/13, 231, 235; 55/DIG. 30; 60/39.5, 310; 423/242.1, 243.01
See application file for complete search history.

(56) References Cited

U.S. PATENT DOCUMENTS

| | | | | |
|---|---|---|---|---|
| 1,791,086 | A | * | 2/1931 | Sperr, Jr. ..................... 95/225 |
| 3,737,515 | A | * | 6/1973 | Veloso ..................... 423/213.7 |
| 3,962,864 | A | | 6/1976 | Williams et al. |
| 3,989,465 | A | * | 11/1976 | Onnen ........................ 422/110 |
| 5,203,161 | A | | 4/1993 | Lehto |
| 5,265,410 | A | | 11/1993 | Hisatome |
| 5,544,479 | A | | 8/1996 | Yan et al. |
| 5,715,673 | A | | 2/1998 | Beichel |
| 5,843,214 | A | | 12/1998 | Janes |
| 6,079,212 | A | | 6/2000 | Tatani et al. |
| 6,156,102 | A | * | 12/2000 | Conrad et al. ................. 95/172 |
| 6,247,302 | B1 | | 6/2001 | Tsukamoto et al. |
| 6,286,301 | B1 | | 9/2001 | Utamura |
| 2001/0020360 | A1 | | 9/2001 | Tsukamoto et al. |
| 2001/0039797 | A1 | | 11/2001 | Cheng |
| 2002/0023423 | A1 | | 2/2002 | Viteri et al. |
| 2002/0026783 | A1 | | 3/2002 | Ultamura |

FOREIGN PATENT DOCUMENTS

| | | | |
|---|---|---|---|
| DE | 2415693 A | * | 10/1975 |
| JP | 55-165130 A | * | 12/1980 |
| JP | 56-037028 A | * | 4/1981 |

* cited by examiner

*Primary Examiner*—Frank M Lawrence

(57) ABSTRACT

A combustion turbine power plant (10) incorporating a desiccating scrubber (140) for simultaneously removing water and sulfur from a flue gas (20) of the power plant (10). The desiccating scrubber (140) may include an inlet nozzle (145) for spraying an aqueous solution (142) containing a desiccant and a base into flue gas (20) so the aqueous solution (142) makes direct contact with flue gas (20). A filter (162) may be provided to collect sulfur compounds downstream of the desiccating scrubber (140) and a regenerator (164) may be provided for recovering water. A controller (148) may control a base supply (170) and a desiccant supply (172) to regulate the respective amounts of each introduced into the aqueous solution (142). Controller (148) may be responsive to sensors (142) measuring the water and sulfur content of flue gas (20) exhausted to atmosphere (144). The desiccating scrubber (140) may include a demister (160) to entrain carryover droplets from a sprayed aqueous solution (142).

3 Claims, 4 Drawing Sheets

WATER AND SULFUR REMOVAL FROM COMBUSTION TURBINE EXHAUST

RELATED APPLICATIONS

This application is a continuation in part of U.S. application Ser. No. 10/247,163 now U.S. Pat. No. 6,804,964 filed on Sep. 19, 2002 and titled Water Recovery From Combustion Turbine Exhaust, the specification of which is herein incorporated by reference. This application is also a divisional of U.S. application Ser. No. 10/959,533 now U.S. Pat. No. 7,017,330, filed Oct. 6, 2004, the specification of which is herein incorporated by reference.

FIELD OF THE INVENTION

This invention relates generally to the field of combustion turbine engines and more particularly, to the removal of sulfur, and the removal and recovery of water from the exhaust of a combustion turbine engine.

BACKGROUND OF THE INVENTION

Water or steam injection can be used for power augmentation and/or the control of nitrous oxide emissions in a combustion turbine powered electrical generating plant. The cost of the water used in this process can be significant, and it is becoming increasingly difficult in some areas to obtain a permit to use water for power generation. Accordingly, it is desirable to recover water from the exhaust stream of a combustion turbine.

Water is a natural byproduct of the combustion of hydrocarbon fuels. It is known that cooling the exhaust stream from a combustion turbine in a condenser to below the precipitation temperature of the moisture in the exhaust gas will result in the condensation of a portion of the moisture contained in the exhaust gas. The quantity and percentage of the moisture recovered is a function of the temperature to which the exhaust can be cooled by the condenser. Ambient air is commonly the ultimate heat sink for such condensers, and the ambient air temperature thus determines the amount of moisture that can be removed by the condenser. In an arid desert environment, where it is most likely that water recovery will be desired, the daytime ambient air temperature may be over 100° F. or even 110° F. and the effectiveness of water removal by an air-cooled condenser is limited.

It is known that sulfur contained in the fossil fuel burned in a combustion turbine will result in the presence of sulfuric acid in the combustion turbine exhaust stream. While the concentration of sulfur may be relatively low, the sulfur compounds, particularly sulfuric acid, will condense from the exhaust gas stream at a slightly higher temperature than the temperature at which water will condense, and thus a locally high concentration of sulfuric acid may develop on portions of the tubes of the condenser. Sulfuric acid is very corrosive to the carbon steels that are normally used to manufacture condenser tubes, and thus stainless steel, having a higher cost, must be used.

U.S. Pat. No. 5,843,214 describes a system for capturing a condensable vapor such as water in a combustion turbine exhaust stream. This system uses a fog of water particles to cause moisture in the combustion turbine exhaust to condense to form a warm rain of condensate. The patent illustrates the condensate being cooled using seawater as the ultimate heat sink. Seawater may be sufficiently cold to provide an adequate level of moisture removal from the combustion turbine exhaust; however, such a system would be far less efficient in a high temperature desert environment where only air-cooled condensate is available.

SUMMARY OF THE INVENTION

Accordingly, an improved system for recovering water from a combustion turbine exhaust stream containing sulfuric acid is needed for use at locations where an adequately cold ultimate heat sink is not available.

A power plant is described herein as including: a combustion turbine engine receiving fuel and air and producing shaft power and exhaust gas; and a water stripper receiving the exhaust gas, the water stripper comprising a desiccant. The power plant may further include a sulfur stripper disposed in a flow path of the exhaust gas between the combustion turbine engine and the water stripper. The sulfur stripper may be a water contact heat exchanger including a media for providing surface area contact between the exhaust gas and a flow of water. A fluid connection may be included for providing water removed from the exhaust gas by the water stripper to the water contact heat exchanger. The power plant may further include a sub-atmospheric regenerator receiving a first concentration of the aqueous solution of the desiccant from the absorber and producing steam and a second, higher concentration of the aqueous solution of the desiccant dryer than the first concentration.

A power plant is described herein as including: a combustion turbine for receiving fuel and air and for producing shaft power and exhaust gas; a sulfur stripper receiving the exhaust gas from the combustion turbine, the sulfur stripper providing surface area contact between the exhaust gas and a flow of water, a portion of the flow of water evaporating into the exhaust gas and sulfur from the exhaust gas condensing into the flow of water; and a heat exchanger receiving the exhaust gas from the sulfur stripper and removing water from the exhaust gas. The heat exchanger may be a direct contact heat exchanger providing surface area contact between the exhaust gas and an aqueous solution of a desiccant. The power plant may further include: a sub-atmospheric regenerator receiving the aqueous solution of the desiccant from the direct contact heat exchanger; and a condenser in fluid communication with the sub-atmospheric regenerator and maintaining a sub-atmospheric pressure in the sub-atmospheric regenerator to produce steam from the aqueous solution of the desiccant.

A water recovery apparatus for use with a combustion turbine engine is described herein as including: a sulfur stripper for removing sulfur from a stream of combustion turbine exhaust gas; and an absorber comprising a desiccant disposed in the stream of combustion turbine exhaust gas downstream of the sulfur stripper for chemically absorbing water from the exhaust gas.

A water recovery apparatus for use with a combustion turbine engine is also described as including: a sulfur stripper for receiving the exhaust gas from a combustion turbine, the sulfur stripper comprising a fill material for providing surface area contact between the exhaust gas and a flow of water for cooling the exhaust gas by evaporating a portion of the flow of water to add moisture to the exhaust gas and to remove sulfur from the exhaust gas into the flow of water; and a water stripper disposed in the exhaust gas downstream of the sulfur stripper for removing water from the exhaust gas.

A method of recovering water from the exhaust of a combustion turbine engine is described herein as including: exposing sulfur-containing exhaust gas from a combustion turbine engine to a flow of water to cool the sulfur-containing exhaust gas to a temperature below a precipitation temperature of sulfur to precipitate sulfur into the flow of water to produce a substantially sulfur-free exhaust gas; and directing the substantially sulfur-free exhaust gas to a water stripper to recover water from the exhaust gas. The method may include exposing the substantially sulfur-free exhaust gas to an aqueous solution of a desiccant to absorb water from the exhaust gas. The method may further include reducing pressure on the aqueous solution of a desiccant to produce steam to remove water absorbed from the exhaust gas.

BRIEF DESCRIPTION OF THE DRAWINGS

These and other advantages of the invention will be more apparent from the following description in view of the drawings that show.

DETAILED DESCRIPTION OF THE INVENTION

Figure 1:
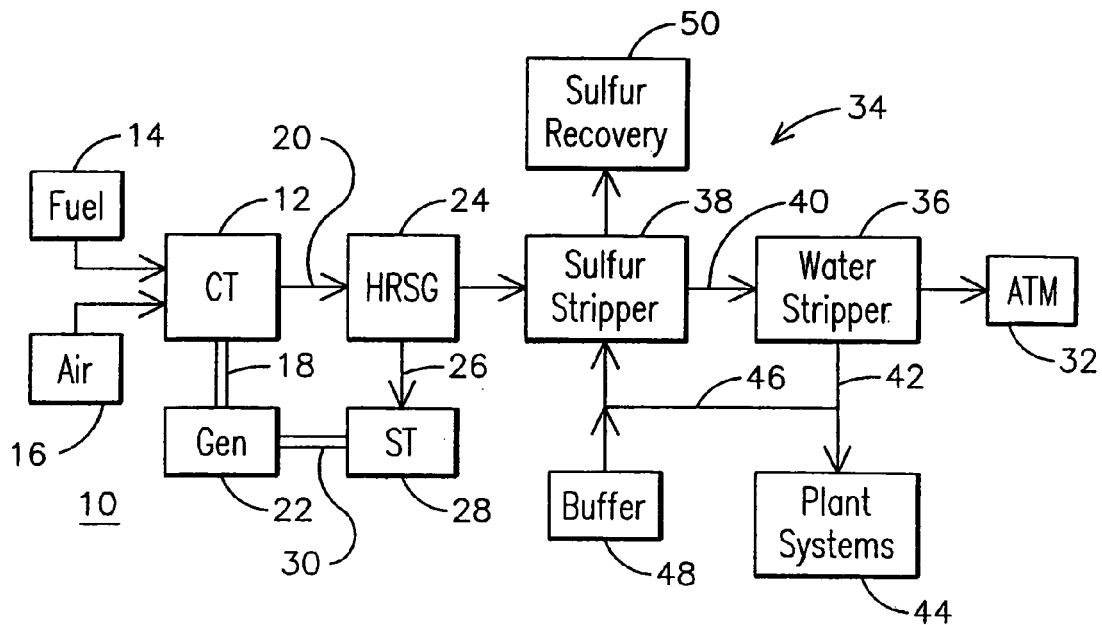
FIG. 1 is a schematic diagram of a combustion turbine power plant including a water recovery system.

FIG. 1 is a schematic diagram illustrating an electrical generating power plant 10 utilizing a combustion turbine 12 as an engine. Combustion turbine 12, sometimes referred to as a gas turbine, incorporates components well known in the art but not illustrated in FIG. 1, such as a compressor, a combustor and a turbine. One such combustion turbine 12 is a Model 501F sold by Siemens Westinghouse Power Corporation, the assignee of the present invention.

The combustion turbine 12 combusts a flow of a fuel 14 such as natural gas, fuel oil, or other liquid or gaseous hydrocarbon fuel in a flow of air 16 to generate shaft power 18 and a stream of exhaust gas 20. The shaft power 18 is used to power an electrical generator 22 and/or other machinery. The exhaust gas 20 may be directed through a heat recovery steam generator 24 to generate steam 26. The steam 26 may be used for various applications within or outside the plant, including powering a steam turbine 28 for providing additional shaft power 30 for driving generator 22 in cooperation with the combustion turbine 12. Optionally, a separate generator (not shown) may be powered by the steam turbine 28.

Before the combustion turbine exhaust gas 20 is released back to the ambient atmosphere 32, it is first directed through a water recovery apparatus 34. Water recovery apparatus 34 includes a water stripper 36 for removing water from the exhaust gas 20. Water recovery apparatus 34 may also include a sulfur stripper 38 disposed upstream of the water stripper 36 in the flow path of the exhaust gas 20 for removing sulfur from the exhaust gas 20 to produce substantially sulfur-free exhaust gas 40. Because the sulfur stripper 38 removes the sulfur delivered to the system in the fuel 14, the substantially sulfur-free exhaust gas 40 may be processed through the water stripper 36 without concern for corrosion caused by the condensation of sulfuric acid.

Water 42 removed from the exhaust gas 40 by the water stripper 36 may be provided for use in various plant systems 44. A fluid connection 46 is provided between the water stripper 36 and the sulfur stripper 38 so that water recovered from the exhaust gas 40 may be used in the operation of the sulfur stripper 38, as described more fully below. A buffering material 48 such as sodium carbonate, for example, may be added to the flow of water 42 either upstream or downstream of the sulfur stripper 38 in order to remove the sulfuric acid condensed out of the exhaust gas 20. The sulfur may be recovered in a sulfur recovery apparatus 50 using any process known in the art of water treatment and chemical processing.

Figure 2:
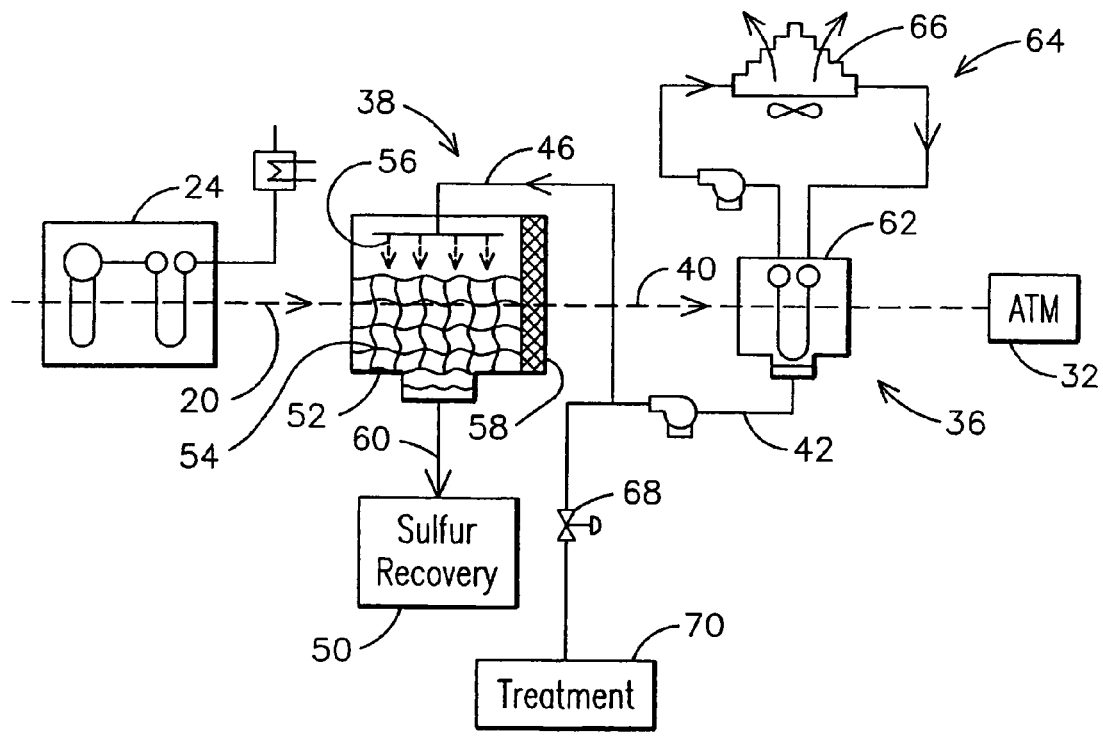
FIG. 2 is a flow diagram illustrating an embodiment of the power plant of FIG. 1.

FIG. 2 is a flow diagram illustrating portions of one embodiment of the power plant 10 of FIG. 1. The exhaust gas 20 exits the heat recovery steam generator 24 and passes into the sulfur stripper 38. The sulfur free exhaust gas 40 exits the sulfur stripper 38 and passes through the water stripper 36 before being exhausted to atmosphere 32. In this embodiment, the sulfur stripper 38 is a direct water contact heat exchanger 52. The direct water contact heat exchanger 52 includes a fill material or media 54 such as polyethylene for providing surface area contact between the exhaust gas 20 and a flow of water 56 for cooling the exhaust gas 20 by evaporating a portion of the flow of water 56 to add moisture to the exhaust gas 20 and to remove sulfur from the exhaust gas 20 to produce the flow of sulfur free exhaust gas 40. A demister 58 may be placed just downstream of the direct water contact heat exchanger 52 to entrain any water particle escaping the media 54.

The flow rate of water 56 supplied to the direct water contact heat exchanger 52 is maintained at a low value not only to minimize the amount of water used, but also to increase the concentration of sulfuric acid in water outflow 60 from the sulfur stripper 38 in order to simplify recovery of the sulfur in the sulfur recovery apparatus 50. In one embodiment where 3.6 million pounds per hour of exhaust gas 20 containing 8.7% absolute humidity and 2 ppm of $H_2SO_4$ at 197° F. is handled, a flow rate of water 56 of approximately 25,000 pounds per hour is used to produce sulfur free exhaust gas 40 having 9% absolute humidity at 111° F. and an outflow of water 60 containing sulfuric acid in the parts per million range.

The embodiment of FIG. 2 also includes a water stripper 36 utilizing a condenser 62 for condensing water 42 from the exhaust gas 40. The condenser 62 of FIG. 1 utilizes a cooling loop 64 including a water-air heat exchanger 66. Water 42 collected by condenser 62 may be directed via fluid connection 46 for use as the flow of water 56 in the sulfur stripper 38, or it may be directed through flow control valve 68 to a treatment process 70 for other applications within the plant 10.

Figure 3:
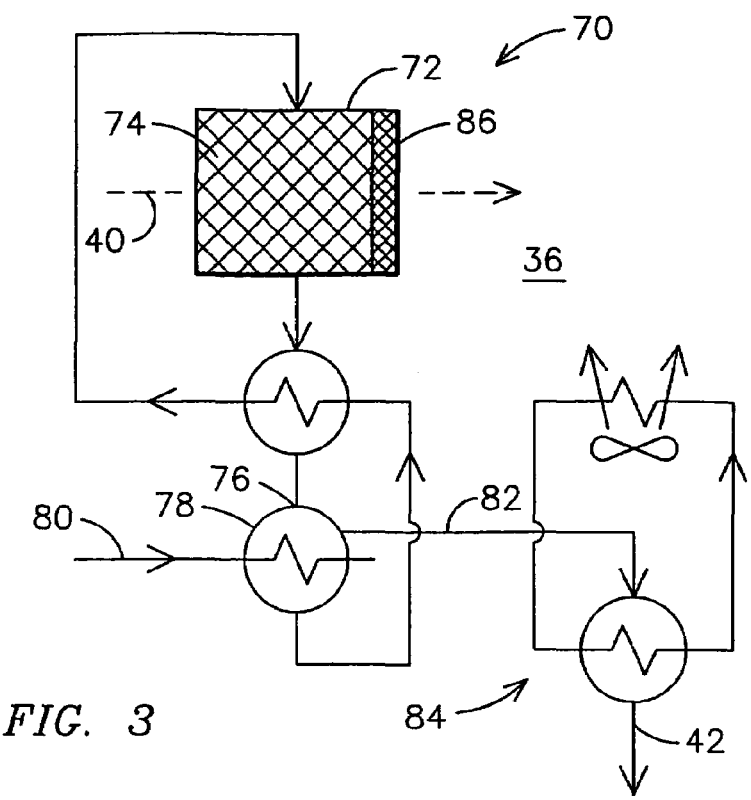
FIG. 3 is a flow diagram of one embodiment of the water stripper portion of the power plant of FIG. 1 utilizing a closed loop of an aqueous solution of a desiccant.

FIG. 3 illustrates a further embodiment of the water stripper 36 of FIG. 1. In this embodiment, a desiccant is used to chemically absorb water from the combustion turbine exhaust gas 40. The desiccant may be lithium bromide, lithium chloride, various hydroxides such as lithium hydroxide or sodium hydroxide, or organic liquids such as polypropylene glycol, or mixtures thereof, for example. The desiccant may be contained in a closed loop 70 of an aqueous solution of desiccant that includes an absorber in the form of a direct contact heat exchanger 72 for providing contact between the desiccant 74 and the exhaust gas 40 for chemically absorbing moisture from the exhaust gas 40 into the desiccant 74.

A solid form of desiccant may be used, such as with a desiccant wheel for alternately exposing the desiccant to the exhaust gas and to a de-watering heat source, however an aqueous form may be simpler to use on the scale of a commercial electrical power generating plant. In one embodiment, a 3.6 million pounds per hour flow of exhaust gas 40 with 9% absolute humidity at 111° F. passes through a media-filled direct contact heat exchanger 72 receiving a flow of approximately 1 million pounds per hour of 64% solution of aqueous LiBr at 120° F. to produce an exhaust having only 4.7% absolute humidity at 184° F. and an aqueous solution of 61.8% LiBr also at 184° F. The 4.7% moisture corresponds to a dew point of 89.6° F. This level of moisture removal would be available with conventional heat exchangers only if the ambient air temperature were below 89.6° F.

Figure 4:
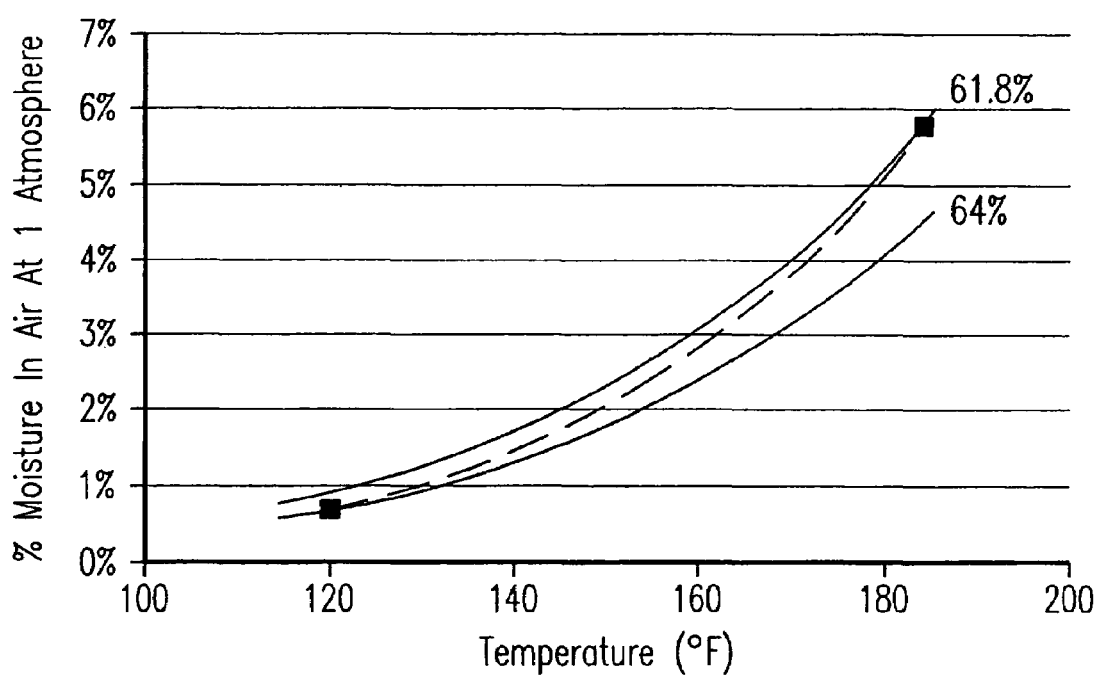
FIG. 4 is a graph illustrating the vapor pressure of lithium bromide solutions.

FIG. 4 shows the vapor pressure of LiBr solutions as a function of temperature and concentration for 64% LiBr and 61.8% LiBr. As the moisture in the solution increases, moisture in the combustion gas decreases and the temperature rises along a path similar to the dotted line. The final temperature and concentration of the LiBr will depend upon the quantity of LiBr solution, the amount of moisture in the exhaust gas, and the quantity of the exhaust gas. Additional moisture can be recovered in a single stage by passing a larger amount of lithium bromide solution through the exhaust gas stream, or a multiple pass system may be used.

The chemical absorption of moisture is a highly exothermic process. The wet desiccant from the heat exchanger 72 is directed to the inlet 76 of a regenerator 78 where a source of heat such as steam supply 80 heats the spent desiccant to reverse the absorption process and to drive off the moisture recovered from the exhaust gas 40 to produce a flow of steam 82. The steam 82 is cooled in a condenser 84 to produce the flow of recovered water 42. A demister 86 may be provided on the downstream side of the heat exchanger 72 in order to entrain any carryover of the desiccant solution 74 in the exhaust stream 40.

One may appreciate that the use of a desiccant 74 will allow the removal of water from a combustion turbine exhaust stream 40 to a lower vapor pressure than would be achieved by chilling, particularly when the temperature of the chilling condenser 62 is limited by a high ambient air temperature. The removal of sulfur from the exhaust stream 40 upstream of the absorber 72 allows the water removal apparatus process and materials to be specified without concern for sulfuric acid corrosion. A purposefully low flow rate of water 56 flowing over a fill media 54 in the sulfur stripper 38 ensures that the concentration of sulfuric acid in the sulfur stripper outflow 60 will be increased to simplify the recovery of the sulfur. This purposefully low flow rate of water 56 results in the evaporation of a portion of the water 56 and an increase in the moisture content of the exhaust 20/40 across the sulfur stripper 38. The improved effectiveness of water removal by a desiccant-based water recovery apparatus 34 facilitates the recovery of this water even in high temperature environments.

Figure 5:
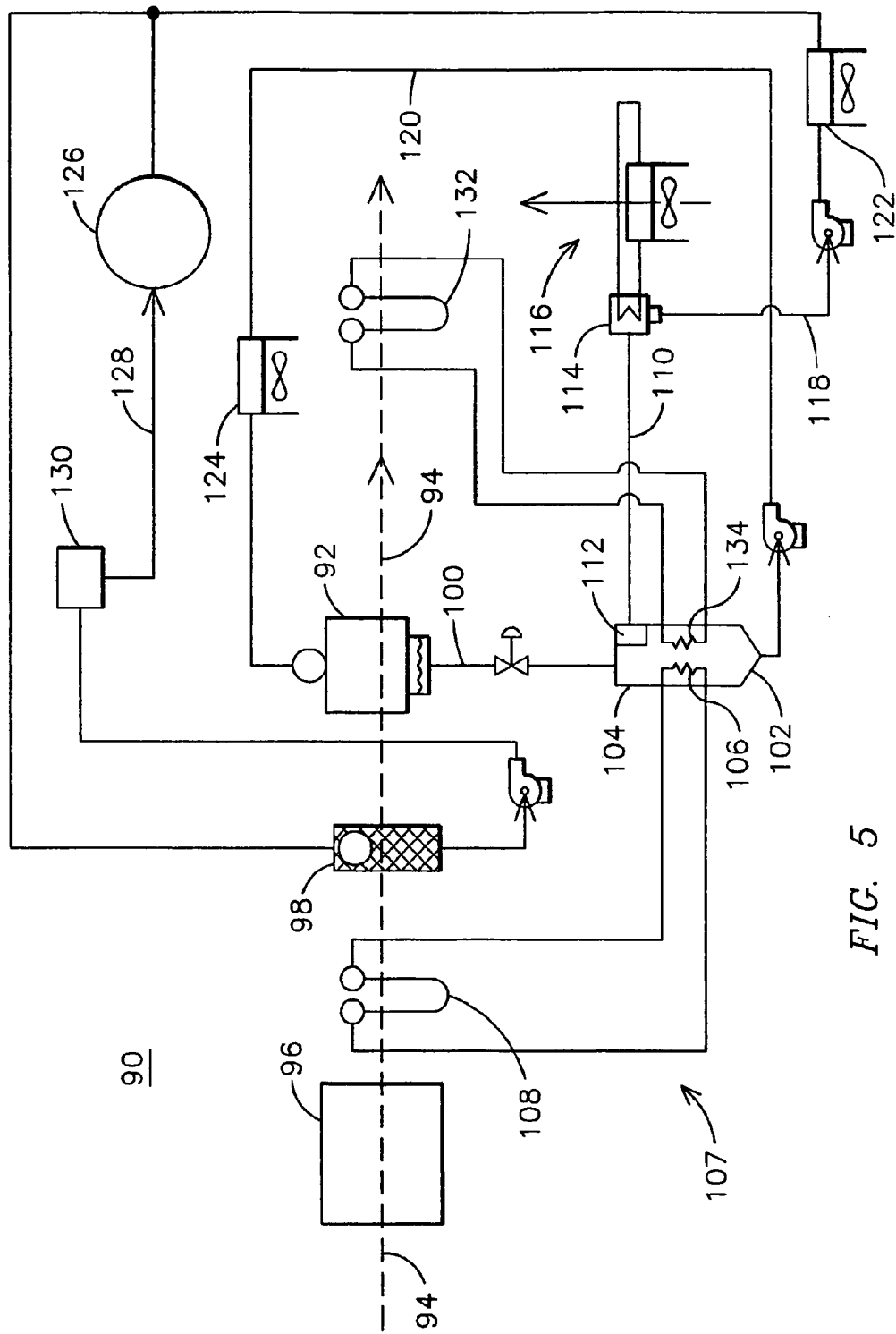
FIG. 5 is a flow diagram illustrating an embodiment of the power plant of FIG. 1.

FIG. 5 illustrates a further embodiment of the present invention illustrating the use of a sub-atmospheric regenerator for separating water from the aqueous solution of the desiccant. FIG. 5 is a flow diagram of a portion of a combined cycle power plant 90 wherein an aqueous desiccant solution is used in an absorber 92 to extract water from the exhaust stream 94 from a gas turbine engine (not shown). As described above, the exhaust stream 94 is first passed through a heat recovery steam generator 96 to extract heat for producing steam for use in a steam turbine portion of the plant (not shown). The exhaust stream 94 is also passed through a cooler/scrubber 98 such as a direct water contact exchanger where sulfur is removed from the exhaust stream 94. The embodiment of FIG. 5 provides for the separation of water from the flow of wet desiccant 100 without the need for high temperature steam by utilizing a sub-atmospheric regenerator 102. The terms wet desiccant and dry desiccant are used herein to refer to the aqueous solution of desiccant after it has absorbed water from the exhaust stream 94 (wet, e.g. an aqueous solution of 61.8% LiBr) and after such water has been removed in a regenerator (dry, e.g. 64% solution of aqueous LiBr).

In one embodiment, the 61.8% LiBr solution wet desiccant 100 leaves the absorber 92 at 167° F. and is flashed in the vacuum chamber 104 of the regenerator 102 through sprays to a pressure of 2 psia for specific water production that is at about 126° F. A submerged heating coil 106 in the chamber 104 adds enough heat to maintain the water removal process. Heating coil 106 may form part of a heat transfer loop 107 for transferring heat to the heating coil 106 from the exhaust stream 94 via a heat exchanger 108 located between the heat recovery steam generator 96 and the cooler/scrubber 98. This heat exchanger 108 will likely operate below the sulfuric acid dew point and may thus require corrosion resistant alloy tubes.

The steam 110 produced in the sub-atmospheric regenerator 102 is directed through a moisture separator 112 to a condenser 114 operating at the lower pressure. The condenser pressure is maintained by a cooling loop 116 such as a freshwater or seawater cooled heat exchanger or the illustrated air-cooled heat exchanger. The recovered water 118 and the dried desiccant 120 may each be cooled further in respective air-cooled heat exchangers 122, 124. The recovered water 118 is directed to a storage tank 126 or combined directly with the water 128 used in the cooler/scrubber 98 after that water 128 has passed through a treatment apparatus 130 to remove the sulfur. The recovered water 118 may then be directed to the cooler/scrubber 98 for further use.

Depending upon the economic parameters of a particular plant, it may be worthwhile to recover the waste heat from any one or all of the exhaust stream 94, the dried desiccant 120, the steam 110 and the recovered water 118. In addition to or in place of heat exchanger 108 located upstream of the absorber 92, a heat exchanger 132 may be located in the exhaust gas stream 94 downstream of the absorber 92 as a source of heat for submerged heating coil 134 to provide heat energy to sub-atmospheric regenerator 102. One skilled in the art will recognize that other arrangements of heat transfer loops or heat generating equipment may be used to deliver heat to the sub-atmospheric regenerator 102, for example a heating jacket, heat pipe, resistance heaters, etc., and that the arrangement selected for a particular application may be determined by economics as well as by engineering constraints.

A method of recovering water from the exhaust of a combustion turbine engine may be practiced with the apparatus described above. Exhaust gas containing a sulfur oxide (sulfur dioxide or sulfur trioxide) from a combustion turbine engine is exposed to a flow of water to cool the sulfur-containing exhaust gas to a temperature below a precipitation temperature of the sulfur to precipitate sulfur into the flow of water to produce a substantially sulfur-free exhaust gas. The substantially sulfur-free exhaust gas is then directed to a water recovery apparatus to recover water from the exhaust gas. This may be accomplished by exposing the substantially sulfur-free exhaust gas to an aqueous solution of a desiccant such as lithium bromide to chemically absorb water from the exhaust gas. The lithium bromide solution is then heated to reverse the process and to drive off the absorbed water in the form of steam. The steam is condensed and may be used as a source of water for precipitating the sulfur from the sulfur-containing exhaust gas. The sulfur may be recovered from the flow of water in a separate process, and the water recovered from the desiccant solution may be used throughout the plant.

Figure 6:
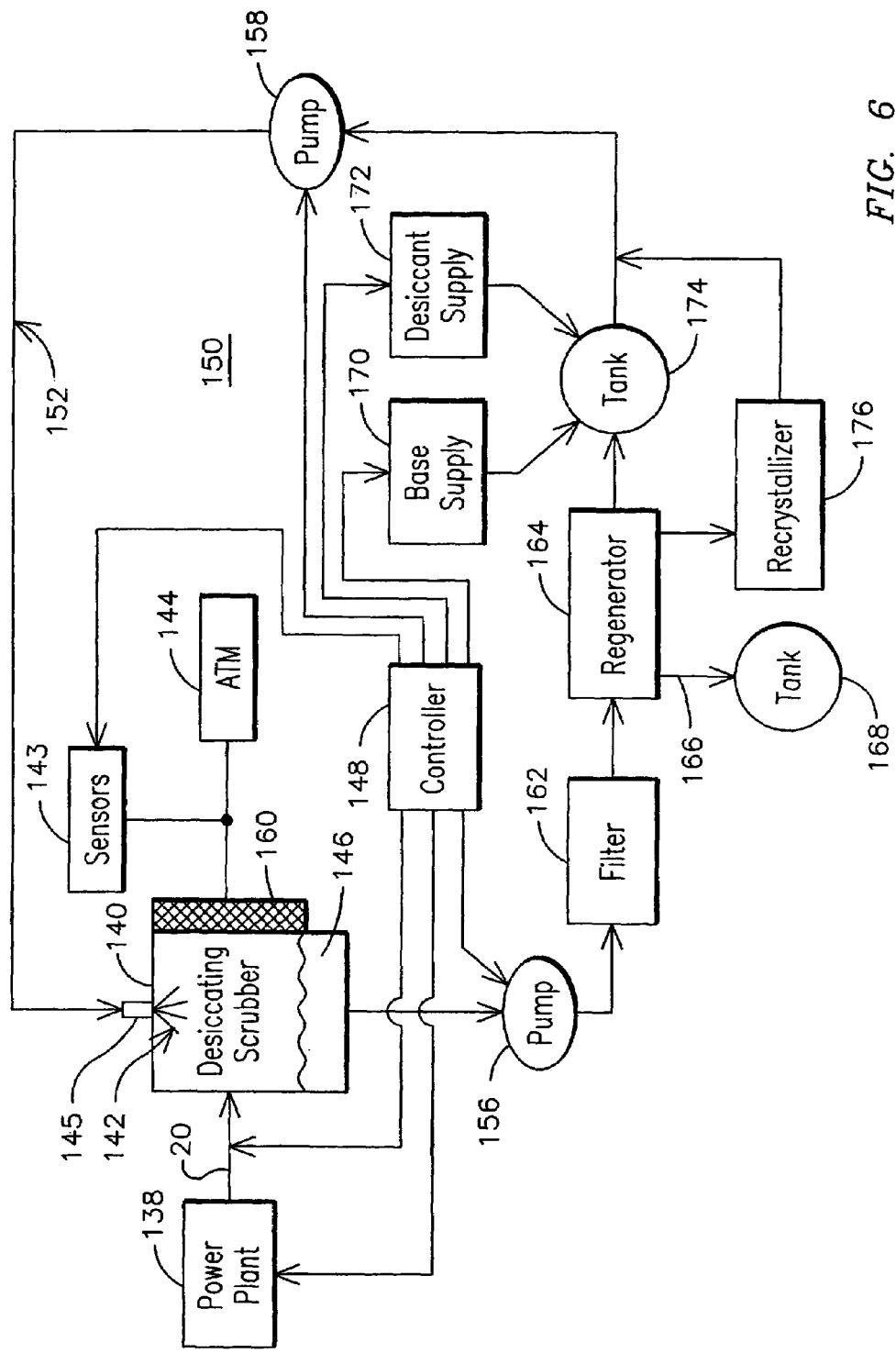
FIG. 6 is a flow diagram illustrating an embodiment of a combustion turbine power plant including a desiccating scrubber.

FIG. 6 illustrates a further embodiment of the present invention illustrating the use of a spray tower or desiccating scrubber 140 for removing moisture and sulfur content from a flue gas 20. Flue gas 20 may be any exhaust gas containing both moisture and sulfur produced by a variety of facilities or plants. For example, combustion turbine power plants, such as power plant 138, coal fire power plants (particularly bituminous or lignite), biomass power plants, oil refineries or other facilities such as those burning fossil fuels may produce flue gas 20.

Flue gas 20 exhausted from power plant 138 enters desiccating scrubber 140 and makes intimate or direct contact with a large surface area of aqueous solution 142 sprayed into desiccating scrubber 140. The intimate contact is sufficiently large to promote a gas-liquid transfer between flue gas 20 and aqueous solution 142. Means for spraying the aqueous solution into desiccating scrubber 140 may be provided such as an appropriately configured nozzle 145. Flue gas 20 may pass through a heat recovery steam generator so its temperature is less than about 300° F. and in an exemplary embodiment is as close to 212° F. as the sulfur dew point allows without actually condensing prior to entering the desiccating scrubber 140.

The sprayed solution 142 may comprise a mixed liquid desiccant and base to be sprayed on flue gas 20 in scrubber 140 to simultaneously remove both sulfur and water from flue gas 20 prior to exhausting to atmosphere 144. The desiccant may be a calcium halide such as calcium chloride, for example, and the base may be calcium hydroxide, for example. It has been found by the inventor of the present invention that a mixture of calcium halide and calcium hydroxide allows for a chemically compatible reaction within flue gas 20 to remove sulfur and water simultaneously. A mixture of a desiccant such as a calcium halide and a base such as calcium hydroxide may be referred to herein as brine, which may also contain constituents from their reaction with flue gas 20. The percentage ratios and concentrations of a desiccant and a base may be a function of various operating parameters or variables of power plant 138 such as the flow rate and sulfur content of flue gas 20, ambient temperature, relative humidity, and others.

A quantity of brine 146 may be contained within a lower portion of desiccating scrubber 140 and circulated through a recirculation loop 150 via a circulation line 152. The quantity of brine 146 may be contained in a separate tank or reservoir. Controller 148 and pumps 156, 158 may control the flow rate of brine 146 through circulation line 152. Recirculation loop 150 may have appropriate valves (not shown) controlled by controller 148 to regulate the flow rate of brine 146 in accordance with aspects of the invention.

Flue gas 20 enters desiccating scrubber 140 where it makes intimate contact with spray 142 of mixed liquid desiccant and base, or brine. Calcium hydroxide contained in droplets of the brine reacts with and removes sulfur trioxide, sulfur dioxide and nitrogen oxides from flue gas 20. Reaction of the calcium hydroxide with these compounds forms calcium sulfite, nitrite, sulfate and nitrate. A calcium halide contained in the droplets of brine absorbs water from flue gas 20 thereby reducing the concentration of the desiccant contained within the brine droplets.

After being exposed to the spray of brine droplets 142, flue gas 20 may exit desiccating scrubber 140 through a demister 160 in order to entrain any carryover of the brine droplets from spray 142 in the exhaust stream flue gas 20 going to atmosphere 144. The flue gas 20 exiting desiccating scrubber 140 has had a quantity of sulfur and a quantity of water removed there from. Means for measuring the sulfur and moisture content of exhausted flue gas 20 may be provided such as sensors 143.

In one aspect, if the measured sulfur and/or moisture is not within a predetermined range as measured by sensors 143, then controller 148 may be programmed to change the flow rate of the brine into the desiccating scrubber 140 so that the exhausted sulfur and/or moisture content is brought within acceptable limits: The brine droplets in the spray of solution 142 may collect at the bottom of the desiccating scrubber 140. They may be transported by pump 156 to a filter 162, which may be configured to remove an amount of precipitated calcium sulfate and any particulates, such as dust or sand that may have been removed from the flue gas 20. Sulfur may be recovered from filter 162 using techniques known in the art such as by backwashing filter 162.

The filtered brine may then be transported to a regenerator 164, such as one of the regenerators 78, 102 described above, where a source of heat such as steam supply 80 (FIG. 3) heats the brine to reverse the absorption process of the desiccant to drive off the moisture recovered from the flue gas 20 and produces a flow of steam 82. The steam 82 may be cooled in a condenser 84 to produce the flow of recovered water 166 that may accumulate in tank 168, which may be in fluid communication with plant systems 44. In this respect, pure water is recovered in tank 168 from flue gas 20 and concentrated brine may then be recirculated into desiccating scrubber 140 through circulation line 152 of recirculation loop 150.

A quantity of the calcium hydroxide, or lime, will be used to combine with the sulfur and nitrogen oxides in flue gas 20 when exposed to the spray of brine 142 within desiccating scrubber 140. One aspect allows for a tank or appropriate supply of base 170, such as calcium hydroxide, to be added to the flow of brine 146 being recirculated to desiccating scrubber 140 to makeup or supplement the quantity of base in brine 146 being recirculated. The desiccant portion of brine 146 may also need to be made-up or supplemented as well as the base portion. Tank or desiccant supply 172 may be provided for introducing a quantity of calcium halide, such as calcium chloride into brine 146 being recirculated in circulation line 152. For example, controller 148 may control the quantity of or rate at which one or both of the desiccant and base are added to the brine in response to signals received from sensors 143. This allows for adjusting the measured content of sulfur and/or moisture being exhausted to atmosphere 144.

Base supply 170 and desiccant supply 172 may be controlled by controller 148 configured to calculate a quantity of base and/or desiccant to be introduced into circulation line 152 based on operating parameters of power plant 138, composition of flue gas 20 or other criteria. For example, if the calcium hydroxide concentration in the brine is inadequate for removing the sulfur content, as it might be if the combustion turbine 10 switched from methane with only a trace of sulfur to fuel oil with 0.5% sulfur in flue gas 20, a quantity of desiccant such as calcium chloride may react with the sulfur not removed to form calcium sulfate leaving hydrochloric acid. In this event, an amount of additional calcium hydroxide introduced into the system may be controlled to react with the hydrochloric acid forming calcium chloride and water. Controller 148 may regulate the introduction of base and/or desiccant into a tank 174 through appropriate valving on supply 170, 172. Tank 174 may be a surge tank for example to ensure pump 158 has sufficient head for pumping solution 146 through circulation line 152.

The nitrate and nitrite salts of calcium formed within brine 146 are soluble and will tend to accumulate within that solution. In one aspect, a quantity of the desiccant may be periodically or continuously withdrawn from recirculation line 152 via regenerator 164 into a re-crystallizer 176 in which the water is evaporated, raising the concentration of the calcium halide until it crystallizes. The crystals are removed and used to make new brine while the liquid residue containing most of the soluble salts is discarded. This allows for the withdrawn desiccant to be re-crystallized to get the calcium chloride back up to a minimum threshold of concentration so the quantity of solution 146 functions as an effective desiccant for removing a desired amount of water from flue gas 20.

Alternate embodiments allow for a quantity of brine 146 to be exposed to flue gas 20 by means other than introducing a sprayed solution 142 containing droplets of brine. For example, a packed bed or open filled structure could also be used such as appropriately configured absorbers or heat exchangers 72, 92 described above. Generally, the packed bed or filled structure may have more pressure drop for the flue gas 20, but it tends to provide better contact between the flue gas 20 and liquid brine containing a desiccant and a base. Overall system constraints such as allowable pressure drop, the desired degree of de-sulfurization and/or de-watering of flue gas 20, for example, as well as other constraints or operating parameters recognized by those skilled in the art may be used to determine which design should be adopted such as one for power plant 138.

It will be appreciated that strontium and barium hydroxide could be used to replace calcium hydroxide as the base; however, they are considerably more expensive than calcium hydroxide and may not prove to be economical. It will be further appreciated that the calcium hydroxide base will remove some of the carbon dioxide in flue gas 20 as calcium carbonate. This process is known as carbon sequestration. Aspects of the invention allow for the composition of the brine to be optimized for carbon sequestration. This may be accomplished by adding other bases, such as amines for example to the brine, which could allow the sequestration of carbon, as well as scrubbing the sulfur and scavenging the water.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim:

1. An apparatus for removing water and sulfur from an exhaust gas, the apparatus comprising:
    a housing for receiving the exhaust gas;
    a flow of a mixture of a desiccant and a base;
    means within the housing for providing surface area contact between the exhaust gas and the mixture of a desiccant and a base; and
    a controller for regulating respective amounts of the desiccant and the base in the flow in response to at least one of a measured concentration of water and sulfur in the exhaust gas exiting the housing.

2. An apparatus for removing water and sulfur from an exhaust gas, the apparatus comprising:
    a housing for receiving the exhaust gas;
    a flow of a mixture of a desiccant and a base;
    means within the housing for providing surface area contact between the exhaust gas and the mixture of a desiccant and a base; and
    a regenerator downstream of the housing for recovering water absorbed by the desiccant from the exhaust gas.

3. An apparatus for removing water and sulfur from an exhaust gas, the apparatus comprising:
    a housing for receiving the exhaust gas;
    a flow of a mixture of a desiccant and a base;
    means within the housing for providing surface area contact between the exhaust gas and the mixture of a desiccant and a base; and
    a sensor for measuring at least one of a moisture content and a sulfur content of the exhaust gas exiting the housing; and
    a controller for regulating a flow rate of an aqueous solution comprising the mixture of the desiccant and the base, the controller responsive to at least one of the measured content.

* * * * *